(12) United States Patent
Durand et al.

(10) Patent No.: US 10,568,346 B2
(45) Date of Patent: Feb. 25, 2020

(54) METHOD AND EQUIPMENT FOR THE CONTINUOUS PRODUCTION OF A POROUS POWDERED PRODUCT

(71) Applicant: CLEXTRAL, Firminy (FR)

(72) Inventors: Daniel Durand, Le Chambon Feugerolles (FR); Jean-Marie Bouvier, Saint Etienne (FR); Gilles Maller, Saint-Marcellin-en-Forez (FR); Scott Maxwell, Berwick (AU); Stewart Stevenson, Matakohe (NZ); Steven Roberts, Raumati South (NZ); Alain Brisset, Unieux (FR)

(73) Assignee: CLEXTRAL, Firminy (FR)

( * ) Notice: Subject to any disclaimer, the term of this patent is extended or adjusted under 35 U.S.C. 154(b) by 463 days.

(21) Appl. No.: 15/361,942

(22) Filed: Nov. 28, 2016

(65) Prior Publication Data

US 2017/0143010 A1 May 25, 2017

Related U.S. Application Data

(63) Continuation of application No. 12/445,674, filed as application No. PCT/FR2007/001684 on Oct. 15, 2007, now abandoned.

(30) Foreign Application Priority Data

Oct. 16, 2006 (FR) ...................................... 06 09055

(51) Int. Cl.
*A23L 2/54* (2006.01)
*A23P 10/40* (2016.01)
(Continued)

(52) U.S. Cl.
CPC ........ *A23L 2/54* (2013.01); *A23L 2/39* (2013.01); *A23L 3/52* (2013.01); *A23L 7/198* (2016.08);
(Continued)

(58) Field of Classification Search
CPC ...... A23L 2/00; A23L 2/385; A23L 2/39; A23L 2/54; A23P 10/40; A23C 9/16; A23C 2210/30
(Continued)

(56) References Cited

U.S. PATENT DOCUMENTS

| 2,953,458 A | 9/1960 | Sjollema |
| 8,268,378 B2 | 9/2012 | Durand et al. |
| 2003/0008059 A1 | 1/2003 | Macinnes et al. |

FOREIGN PATENT DOCUMENTS

| AR | 048353 A1 | 4/2006 |
| AR | 051574 A1 | 1/2007 |

(Continued)

*Primary Examiner* — Erik Kashnikow
*Assistant Examiner* — Lela S. Williams
(74) *Attorney, Agent, or Firm* — Polsinelli PC

(57) ABSTRACT

The present invention relates to a method for producing a powdered porous product from at least one starting powdery and/or viscous product, characterised in that it comprises the continuous following steps without exposing the product to open air: a) preparing the starting product in order to make it viscous; b) in a thermo-mechanical machine (10) for continuously realising transport and/or mixing functions of viscous products or dry-material rich products, lowering the viscosity of the viscous product without changing its dry-material content, by intimate mixing with a gas injected into the processing machine (10) and simultaneously initiating the porosity in the viscous product; c) continuously with the processing machine (10), statically or dynamically intensifying the intimate mixture of the viscous product with a gas in order to obtain an aerated and porous mass; and d), dividing said mass in order to obtain aerated and porous particles.

22 Claims, 3 Drawing Sheets

Figure 1:
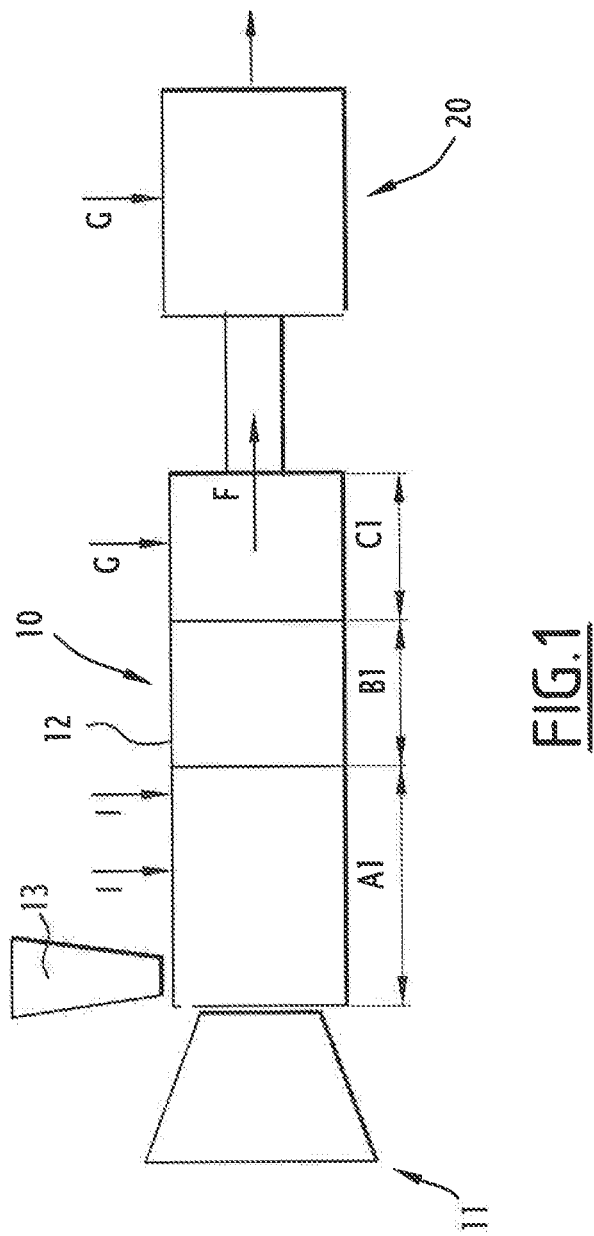

(51) Int. Cl.
  *A23P 30/20*  (2016.01)
  *A23L 7/10*  (2016.01)
  *A23L 3/52*  (2006.01)
  *B01J 2/20*  (2006.01)
  *A23L 2/39*  (2006.01)

(52) U.S. Cl.
  CPC ............. *A23P 10/40* (2016.08); *A23P 30/20* (2016.08); *B01J 2/20* (2013.01); *A23V 2002/00* (2013.01)

(58) Field of Classification Search
  USPC .................. 426/588, 580, 492, 471, 388
  See application file for complete search history.

(56) References Cited

FOREIGN PATENT DOCUMENTS

| EP | 1133923 A | 9/2001 |
|---|---|---|
| FR | 2875589 A1 | 3/2006 |
| WO | WO 2005/100890 A1 | 10/2005 |
| WO | WO-2006/032797 A | 3/2006 |

METHOD AND EQUIPMENT FOR THE CONTINUOUS PRODUCTION OF A POROUS POWDERED PRODUCT

CROSS REFERENCE TO RELATED APPLICATIONS

This application is a Continuation of U.S. application Ser. No. 12/445,674 filed Apr. 15, 2009, which is the National Phase filing under 35 U.S.C. § 371 of PCT/FR2007/001684 filed Oct. 15, 2007, which claims priority to Patent Application No. 0609055, filed in France on Oct. 16, 2006. The entire contents of each of the above-applications are incorporated herein by reference.

The present invention relates to a method and equipment for the production of a porous powdered product from at least one pulverulent and/or viscous starting product.

Methods for producing powdered products are known which allow a viscous product to be dehydrated and, at the same time, converted into a porous powder. With these methods, powdered milk or rehydratable instant drinks, for example, are obtained.

This type of product exhibits a specific rheological behavior, which is characterized by exponential-type viscosity curves, as a function of the content of dry matter, which exhibit a very marked reversal point above a specific content of dry matter. For example, for the skimmed milk presented in FIG. 3, the reversal point is located at about 50% dry matter.

Known technologies and methods which allow the product to be obtained below the reversal point of these curves can no longer be extrapolated beyond that point.

There is known from document CH-A-86838, which claims a method for continuously drying, on mats, an aerated liquid product of dairy origin having a maximum content of dry matter of approximately 48%. A particular disadvantage of this method is that it is limited in terms of the content of dry matter in order to comply with a relatively low viscosity which enables the quality of the product of dairy origin to be retained.

A known method is lyophilization or freeze-drying, which is a static method of drying or of removing water by sublimation at low temperature and in vacuo. This method is intended for products in the liquid state but also for moist solid products. However, it has the disadvantage of being very expensive and lacking productivity.

Also known is a method of drying by means of heated rollers which allows liquids or solid-liquid suspensions to be dehydrated completely, but their viscosity must be low in order to allow them to be formed into a thin layer on the rollers. In general, the content of dry matter is limited. For example, the limit for milk is of the order of 50%. Moreover, the resulting powder is of low porosity and is not instantly rehydratable.

These known methods all have major disadvantages. They are limited technologically by the viscosity of the product to be dried, that is to say by its content of dry matter, or they are limited in terms of the functionality of the finished product, especially in respect of instant rehydration. Finally, they are generally very expensive to carry out.

Another known method is drying by atomization, which allows more or less concentrated liquid products to be dehydrated. This method also has the disadvantage of being relatively expensive owing to investment costs and energy-related operating costs. Above all, the method is limited by the viscosity of the starting product, which must be relatively low because the product has to be pulverized or atomized into very fine droplets in order that the heat-exchange surface between the hot air and the product is as large as possible. These atomization conditions are limited by the viscosity of the starting product and therefore its content of dry matter. In the case of milk, the starting product has a maximum content of dry matter of the order of from 50 to 55%.

In addition, it is not possible with this method to work a product having a high viscosity or a high content of dry matter which is difficult to transport in the various steps by pumping without employing very high pressures and therefore sophisticated, heavy and expensive equipment.

In order to remedy those disadvantages, there is known from document WO 2006/032797 a method for preparing a powdered product, starting from the product in the liquid state. In this method, continuous drying is carried out by thermomechanical treatment, using a thermomechanical treatment machine into which there are simultaneously injected the preconcentrated product in liquid form and a given proportion of powdered product from the same family as the preconcentrated liquid product, in order to obtain, after mixing, a viscous or pasty product in which the concentration of dry matter varies from 70 to 85% and is preferably from 80 to 85%. The thermomechanical treatment machine therefore carries out mixing of the preconcentrated liquid product and of the powdered product from the same family according to an operation of plasticisation-mixing by shear in a laminar regime.

This plasticisation-mixing operation is feasible in purely technical terms, but it yields a final product which is markedly impaired in terms of its functional properties, especially in respect of its porosity and instant solubility. This impairment is all the greater, the higher the rate of incorporation of powdered product, owing to the impact of the mechanical shearing thereon. In addition, the injection of gas during a swelling phase does not bring about a sufficient improvement to the functional properties of the final product, all the more so because the concentration of dry matter in the product is high.

The problem to be solved therefore resides in the necessity of handling a very viscous product and of aerating it while structuring its porosity.

That problem is easily solved in the case of low viscosity products but is very difficult to solve in the case of very viscous products.

There is therefore a conflict between the necessity of handling a very viscous product and of aerating it by making a gas enter the product, and still further of dispersing the gas in the mass of the product.

The methods known and used hitherto therefore do not allow a porous powdered product to be obtained from the very viscous product under satisfactory technical and economic conditions.

The object of the invention is to propose a method and equipment which allow that problem to be solved by obtaining a powdered product which has good characteristics of porosity, instant solubility and apparent density, while improving productivity and reducing energy costs.

The invention therefore relates to a method for the production of a porous powdered product from at least one pulverulent and/or viscous product, characterized in that the following steps are carried out continuously and without exposing the product to the open air:

a) the starting product is prepared in order to bring it into a viscous state of viscosity greater than 100 mPa·s and preferably greater than 200 mPa·s, b) in a thermomechanical treatment machine for continuously carrying out at least transport and/or mixing functions for viscous products or products rich in dry matter:
the viscosity of the product in the viscous state is lowered without changing its content of dry matter by a first operation of intimate mixing with a gas injected into the thermomechanical treatment machine, and
porosity is simultaneously initiated in the product in the viscous state, c) continuously with the thermomechanical treatment machine, the intimate mixing of the product in the viscous state is intensified in a static or dynamic manner by a second operation of mixing with a gas in order to obtain an aerated and porous mass, and d) the mass is divided in order to obtain aerated and porous particles having a content of dry matter of from 50 to 90% and a particle size less than or equal to 3 mm.

According to other features of the invention:
the product in the viscous state is prepared in the thermomechanical treatment machine from at least one pulverulent product having a content of dry matter of from 70 to 98% and by carrying out at least one step of mixing with at least one ingredient and/or at least one shearing step and/or at least one heat treatment step before the viscosity of the product in the viscous state is lowered, the product in the viscous state is prepared in the thermomechanical treatment machine from at least one pulverulent product having a content of dry matter of from 70 to 98% and by carrying out at least one step of mixing with at least one ingredient and subsequently a step of mixing with a product in the viscous state and/or at least one shearing step and/or at least one heat treatment step before the viscosity of the product in the viscous state is lowered, the first and second operations of mixing the product in the viscous state and the gas are carried out starting from an injection of the gas, the product in the viscous state from the same family as the product to be obtained is prepared before it is introduced into the thermomechanical treatment machine, the product in the viscous state is introduced into the thermomechanical treatment machine and, before the viscosity of the product in the viscous state is lowered, at least one step of mixing with at least one ingredient and/or at least one shearing step and/or at least one heat treatment step is carried out, the product in the viscous state from the same family as the product to be obtained has a viscosity greater than 100 mPa·s and preferably greater than 200 mPa·s and a content of dry matter of from 50 to 90%, and the gas mixed with the product in the viscous state in the thermomechanical treatment machine is identical with or different from the gas mixed with the product in the viscous state downstream of said machine.

The invention relates also to equipment for the production of a porous powdered product from at least one pulverulent and/or viscous starting product, characterized in that it comprises, continuously and without exposing the product to the open air:
means for preparing the starting product in order to bring it into a viscous state of viscosity greater than 100 mPa·s and preferably greater than 200 mPa·s, a thermomechanical treatment machine comprising at least one transport and/or mixing step for viscous products or products rich in dry matter, and a step of aeration of the product in the viscous state by a first operation of intimate mixing with a gas in order to lower the viscosity of the product and simultaneously initiate porosity in said product without changing its content of dry matter, a static or dynamic aeration device connected directly to the thermomechanical treatment machine in order to carry out a second operation of mixing the product with a gas, intensifying the reduction in viscosity of said product, and obtain an aerated and porous mass, and a means of separating the mass in order to obtain aerated and porous particles having a content of dry matter of from 50 to 90% and a particle size less than or equal to 3 mm.

According to other features of the invention:
the means for preparing the product are incorporated into the thermomechanical treatment machine,
the thermomechanical treatment machine is a machine having rotating screw(s),
the thermomechanical treatment machine is an extrusion machine having two co-rotating and co-penetrating screws, and
the thermomechanical treatment machine is a single-screw extrusion machine.

Figure 2:
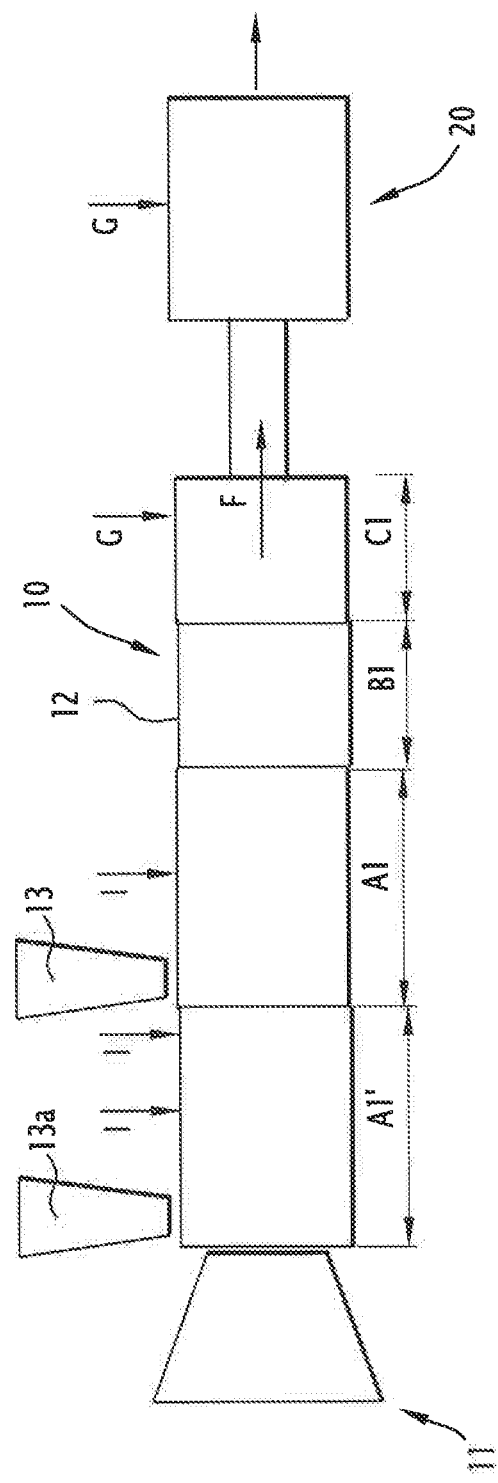
Figure 3:
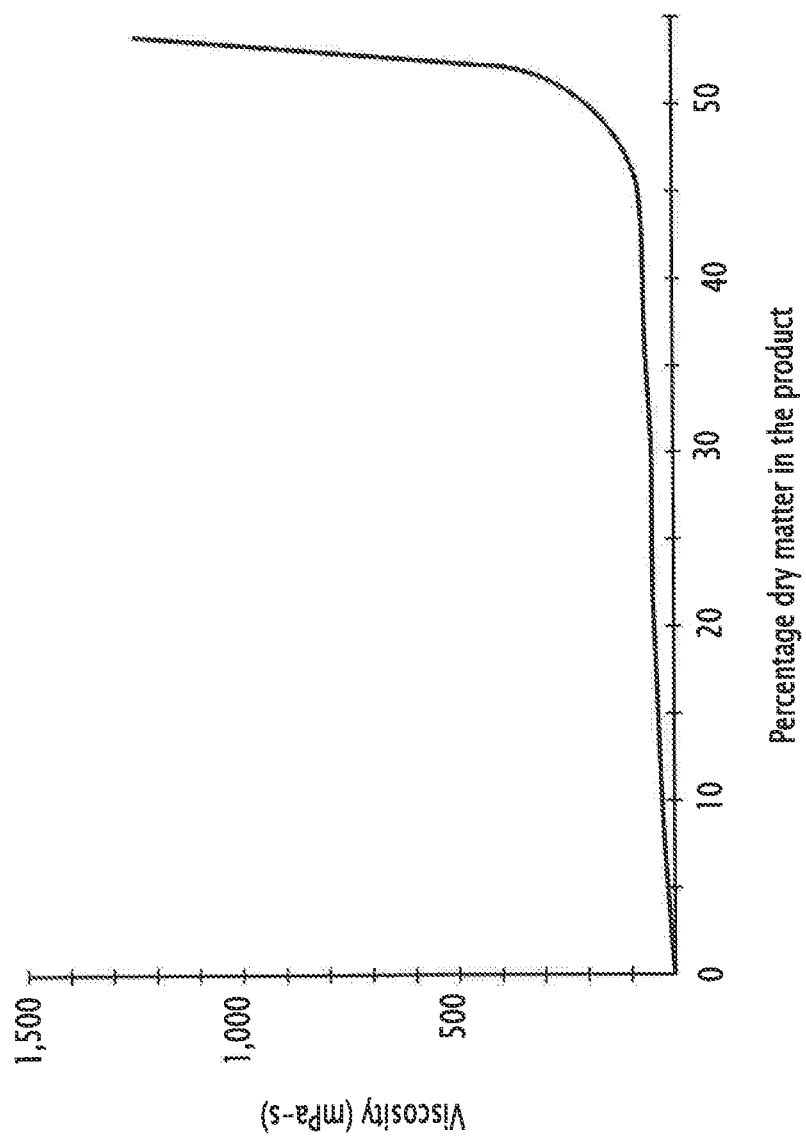

Other features and advantages of the invention will become apparent from the following description, which is given with reference to the accompanying drawings, in which:

FIG. 1 is a front view, in diagrammatic form, of equipment for the production of a porous powdered product from a starting product in the viscous state, according to the invention, FIG. 2 is a front view, in diagrammatic form, of equipment for the production of a porous powdered product from a pulverulent starting product with mixing with a viscous product, according to the invention, FIG. 3 is a curve showing the change in the viscosity of a product, for example skimmed milk.

FIGS. 1 and 2 show, in diagrammatic form, equipment for the continuous production of a porous powdered product from at least one pulverulent and/or viscous product, which equipment comprises two main elements located one after the other, a thermomechanical treatment machine designated as a whole by the reference numeral 10, and a static or dynamic aeration device designated by the general reference numeral 20 for mixing the product leaving the thermomechanical treatment machine 10 with a gas, as will be seen hereinbelow.

The thermomechanical treatment machine is preferably constituted by an extrusion machine 10 having two co-rotating and co-penetrating screws.

In that case, and in a known manner, the extrusion machine 10 comprises two screws (not shown) which are driven in rotation about their axes by a motor and a reduction gear, which are designated by the general reference numeral 11, inside an elongate vessel forming a sleeve 12 which envelops them. The screws of the extrusion machine 10 are equipped especially with helical threads or other elements for treating the product introduced into the sleeve 12 and which engage with one another. The helical threads or the elements forming the screws of the extrusion machine 10 determine different treatment zones for the product introduced into the sleeve 12.

The starting product is constituted by:
a viscous product having a content of dry matter of from 50 to 90% and a viscosity greater than 100 mPa·s and preferably greater than 200 mPa·s (FIG. 1), said viscous product being from the same family as the product to be obtained, or at least one pulverulent product which has a content of dry matter of from 70 to 98% and is mixed with a viscous product having a content of dry matter of from 50 to 90% and a viscosity greater than 100 mPa·s and preferably greater than 200 mPa·s (FIG. 2), or at least one pulverulent product having a content of dry matter of from 70 to 98%.

The sleeve 12 is equipped at its upstream end, relative to the direction of flow of the product indicated by the arrow F, with a feed orifice (not shown) surmounted by means 13 for introducing the product to be treated into the extrusion machine 10.

In general, the starting product undergoes various treatments and various modifications in the extrusion machine 10 and in the aeration device 20 in order to obtain a porous powdered product which is in the form of aerated and porous particles.

Referring now to FIG. 1, the equipment 10 will be described in the case where the starting product is a viscous product from the same family as the final product obtained. In this case, the starting product in the viscous state is prepared before it is introduced into the extrusion machine 10.

The extrusion machine 10 is composed of a plurality of zones comprising, according to the nature of the starting product:

a first zone A1 which is a transport zone for the product or rich in dry matter and/or a zone for mixing with at least one ingredient and a heat treatment zone, a second zone B1 which is a transport zone for the product in the viscous state obtained in zone A1, zone B1 is a transport, shearing and heat treatment zone for the product, a third zone C1 in which the viscosity of the product in the viscous state is lowered and porosity is simultaneously initiated in the product in the viscous state, the third zone C1 likewise being a heat treatment zone for the product.

In zone A1 of the extrusion machine 10, different ingredients I can be introduced through one or more orifices provided in the sleeve 12, for example lecithin and/or water and/or flavorings and/or colorings and/or other appropriate ingredients, in order to mix them with the starting product.

In zone C1, the sleeve 12 of the extrusion machine 10 has at least one orifice for injecting into said sleeve 12 a gas G which is intimately mixed with the product in the viscous state in order to lower the viscosity of the product in the viscous state without changing its content of dry matter.

Simultaneously with the lowering of the viscosity of the product in the viscous state, porosity is initiated in the product in the viscous state by the injection of the gas. Intimate mixing of the product in the viscous state and the gas is facilitated by the working of the product in the co-penetrating and co-rotating screws of the extrusion machine 10.

The gas injected into zone C1 of the extrusion machine 10 is, for example, carbon dioxide, air, steam, nitrogen or an oxide thereof.

By way of example, the screws of the extrusion machine 10 are driven in rotation at a speed of from 50 to 1200 rpm and zone C1 has, for example, a ratio L/D between the length L of zone C1 and the diameter D of the screws of the extrusion machine of from 3 to 12.

The product at the outlet from the thermomechanical treatment machine has a concentration of dry matter of from 50 to 90%.

At the outlet from the extrusion machine 10, the product in the viscous state, the viscosity of which has been lowered in zone C1 of the extrusion machine 10, is transferred directly and continuously, and without being exposed to the open air, to the static or dynamic aeration device 20.

In the aeration device 20, the intimate mixing of the product in the viscous state with a gas is intensified in order to obtain an aerated and porous mass.

In the device 20, the gas injected is, for example, carbon dioxide, air, steam, nitrogen or an oxide thereof.

In the case of a static aeration device, the device 20 is constituted, for example, by a helical mixer, and in the case of a dynamic aeration device, the device 20 is constituted by a device equipped with agitator blades.

The totality of the treatment of the product in the viscous state in the extrusion machine 10 and in the aeration device 20 is carried out continuously and without exposing the product to the open air.

Accordingly, the device 20 is located directly at the outlet of the extrusion machine 10 or is connected to the outlet of the extrusion machine 10 by a joining element constituted, for example, by at least one leak-tight and continuous tube.

At the outlet from the device 20, the equipment comprises a means for separating the aerated and porous mass so obtained in order to obtain aerated and porous particles which are smaller than 3 mm and preferably smaller than 2 mm. The separation means is constituted, for example, by orifices provided at the outlet from the device 20.

The percentage of gas in total injected into the extrusion machine 10, expressed as percent by volume based on the dry mass of the product treated in said machine 10, is from 0.01 nl·kg$^{-1}$·mn$^{-1}$ to 10 nl·kg$^{-1}$·mn$^{-1}$, the volume of gas being expressed under normal temperature and pressure conditions.

The gas injected into zone C1 represents from 30 to 60% of the total amount of gas injected into the equipment, and the gas injected into the device 20 represents from 40 to 70% of the total amount of gas injected.

The particles so obtained have a concentration of dry matter of from 50 to 90%, a solubility greater than 90% and an internal porosity greater than 50%.

At the outlet from the aeration device 20, the equipment can comprise a device for drying the aerated and porous particles, and the drying device is formed by at least one fluidized-bed dryer or by at least one atomizing tower or by a counter-current vertical dryer or by a conveyor dryer. After this additional drying, the particles have a concentration of dry matter of the order of 96%.

Referring now to FIG. 2, the equipment 10 will be described in the case where the starting product is at least one pulverulent product.

The extrusion machine 10 is composed of a plurality of zones comprising, according to the nature of the starting product:

a first zone A1 which is a transport zone for said at least one pulverulent product and/or a zone for mixing with at least one ingredient and/or a heat treatment zone in which the product is brought to a temperature of from 20 to 80° C., a second zone A1 which is a zone for mixing of the product obtained in zone A1 with a viscous product from the same family as the final product to be obtained and for heat treatment of the mixture brought to a temperature of from 40 to 200° C., said viscous product having a content of dry matter of from 50 to 90% and a viscosity greater than 100 mPa·s and preferably greater than 200 mPa·s, a third zone B1 which is a transport and shearing zone for the product in the viscous state and in which the product in the viscous state is maintained at a temperature of from 40 to 200° C., and a fourth zone C1 in which the viscosity of the product in the viscous state is lowered and porosity is simultaneously initiated in the product in the viscous state while maintaining the product at a temperature of from 40 to 200° C.

The sleeve 12 is equipped at the start of zone A1 with a feed orifice (not shown) surmounted by means 13a for introducing the product to be treated into the extrusion machine 10.

In zones A'1 and A1 of the extrusion machine of FIG. 2, different ingredients I can be introduced through one or more orifices provided in the sleeve 12, for example lecithin and/or water and/or flavorings and/or colorings or other appropriate ingredients, in order to mix them with the starting product.

Analogously to zone C1 of the first embodiment shown in FIG. 1, the sleeve 12 of the extrusion machine of the second embodiment shown in FIG. 2 has at least one orifice for injecting into said sleeve a gas G which is mixed intimately with a product in the viscous state in order to lower the viscosity of the product in the viscous state without changing its content of dry matter.

The gas injected into zone C1 of the extrusion machine 10 is, for example, carbon dioxide, air, steam, nitrogen or an oxide thereof.

The speed of rotation of the screws of the extrusion machine 10 is identical with that of the preceding embodiment, and the characteristics of the screws are analogous.

At the outlet from the extrusion machine 10, the product in the viscous state, the viscosity of which has been lowered in zone C1 of the extrusion machine 10, is likewise transferred directly and continuously, and without being exposed to the open air, to the static or dynamic aeration device 20, which is identical with that of the preceding embodiment.

In the aeration device 20, the intimate mixing of the product in the viscous state with a gas is intensified in order to obtain an aerated and porous mass.

In the device 20, the gas injected is, for example, carbon dioxide, air, steam, nitrogen or an oxide thereof.

The gas injected into zone C1 of the embodiment of FIG. 2 represents from 10 to 80% of the total gas injected into the equipment, and the gas injected into the device 20 represents from 20 to 90% of the total amount of gas injected.

At the outlet from the device 20, the particles so obtained have a temperature of from 20 to 90° C. and a particle size less than or equal to 3 mm.

The equipment can also comprise a device for drying the aerated and porous particles at the outlet from the aeration device 20, and the resulting particles have a concentration of dry matter of the order of 96%.

The gas injected into the extrusion machine 10 can be identical with or different from the gas injected into the device 20.

In general, a first operation of mixing the product in the viscous state with a gas is carried out in the thermomechanical treatment machine 10, and a second operation of mixing the product in the viscous state with a gas is carried out in the aeration device 20. The second mixing operation in the aeration device 20 is carried out under pressure.

According to a first example, the product in the viscous state is milk, powdered milk thereby being obtained.

According to a second example, the product in the viscous state is a natural or (physically and/or chemically) modified starchy product based on cereal (wheat, oat, maize, barley, etc.) flours, potato flour, potato granules, potato flakes and/or tapioca flour, the product initially being in the form of a mixture of the solution, suspension or emulsion type in an aqueous medium, the method yielding the product in pulverulent form.

According to a third example, the product in the viscous state is a natural or (physically and/or chemically) modified protein product selected from milk casein, wheat gluten, maize zein, soybean proteins, legume proteins, in particular pea proteins and/or proteins of oleaproteaginous crops, in particular sunflower or rape, the product initially being in the form of a mixture of the solution, suspension or emulsion type in an aqueous medium, the method yielding the product in pulverulent form.

According to a fourth example, the product in the viscous state is a milk fractionation co-product/by-product obtained by fractionating milk by centrifugation, filtration, nanofiltration, ultrafiltration and/or reverse osmosis, or a co-product obtained by coagulation of milk.

In general, the method according to the invention carried out using the equipment which combines an extrusion machine, in which the viscosity is lowered and porosity is initiated, and a static or dynamic aeration device, in which the increase in the porosity of the product is continued, therefore makes it possible to work very viscous products and to aerate them while structuring their porosity, which is not the case with the methods used hitherto.

In fact, as is shown by way of example in FIG. 3, which shows the change in the viscosity of a product such as skimmed milk as a function of its percentage of dry matter, it will be seen that the viscosity of the product increases exponentially from a content of 50% dry matter. For other products, the curves may be different but show the same exponential increase, with a marked reversal point corresponding to a content of dry matter which is generally from 10 to 90%, depending on the nature and composition of the solutions, suspensions or emulsions under consideration.

The technological solutions known hitherto, which allow the product to be treated below the reversal point of the curve, are not suitable beyond that point.

In the case of skimmed milk, for example, it will be seen that a technological jump must be imagined and implemented in order to be able to transport, mix, aerate that product at a content of dry matter greater than 50% owing to its viscosity, which becomes very high.

The method and equipment according to the invention therefore allow very viscous products having a concentration of dry matter of from 50 to 90% to be handled and treated, and aerated and porous particles having good characteristics of porosity, wettability, instant solubility and apparent density to be obtained.

Depending on the nature of the product, the content of dry matter can vary from 10 to 90% with a viscosity greater than 100 mPa·s.

Moreover, the method and equipment according to the invention allow productivity to be improved while energy costs are reduced.

According to a variant, the starting product can be constituted by at least one pulverulent product having a content of dry matter of from 70 to 98% without being mixed with a product in the viscous state. In this case, the equipment is identical with the equipment of FIG. 2.

EXAMPLES

A. Powdered Milk
  Starting product: concentrated milk with a concentration of dry matter of 65% and a viscosity greater than 1000 mPa·s
  Extrusion machine 10:
    zone A: optional mixing with lecithin
    zone C: injection of 50% of the total amount of gas
    temperature of the product below 50° C.
  Aeration device 20
    injection of 50% of the total amount of gas
    temperature of the product below 50° C.
  Resulting particles smaller than 2 mm with a concentration of dry matter of from 65 to 85%.

B. Instant Drinks

1ST EXAMPLE

Starting product: oat flour 55%—sugar 37%—chocolate powder 8%
Extrusion machine
  zone A: mixing with water
    temperature of the product from 120 to 150° C.
  zone B: viscous product with a concentration of dry matter of from 60 to 70%
    temperature of the product from 120 to 150° C.
  zone C: injection of carbon dioxide 80% of the total amount of gas
    temperature of the product of the order of 70° C.
Aeration device 20
  injection of carbon dioxide 20% of the total amount of gas
  temperature of the product of the order of 60° C.
Resulting particles smaller than 3 mm with a concentration of dry matter of from 60 to 80%.

2ND EXAMPLE

Starting product: maize flour 91.5%—cassava starch 8%—calcium carbonate 0.5%
Extrusion machine
  zone A: mixing with water
    temperature of the product from 60 to 100° C.
  zone B: viscous product with a concentration of dry matter of from 60 to 80%
    temperature of the product from 120 to 150° C.
  zone C: injection of carbon dioxide 90% of the total amount of gas
    temperature of the product from 150 to 200° C.
Aeration device 20
  injection of carbon dioxide 10% of the total amount of gas
  temperature of the product of the order of 90° C.
Resulting particles smaller than 3 mm with a concentration of dry matter of from 70 to 90%.

The invention claimed is:

1. A method for producing a porous powdered product, the method comprising:
  step (a) preparing a viscous product having a viscosity greater than 100 mPa·s from a viscous or pulverulent starting product,
  step (b) treating the prepared viscous product of step (a) in a thermomechanical treatment machine into which a first gas is injected, and then in a static or dynamic aeration device into which a second gas is injected, step (b) including two successive sub-steps (b1) and (b2) which are performed continuously and without exposing the ongoing treated product to the open air both during and between the sub-steps (b1) and (b2), and wherein:
    sub-step (b1), comprises mixing the prepared viscous product of step (a) and the first gas in the thermomechanical treatment machine to obtain an intermediate mixture consisting essentially of the prepared viscous product of step (a) and the first gas and having a dry matter content that is unchanged from the prepared viscous product of step (a), so that at the end of sub-step (b1) the intermediate mixture has a viscosity that is lower than the viscosity of the prepared viscous product of step (a) and porosity is initiated in the intermediate mixture, and
    sub-step (b2), comprises mixing the intermediate mixture of sub-step (b1) and the second gas in the aeration device to obtain a treated product in the form of an aerated and porous product, and
  step (c) spray drying aerated and porous product of sub-step (b2) to obtain the porous powdered product, so that at the end of step (c), the porous powdered product comprises particles having a dry matter content of from 50 to 90% by weight and a particle size less than or equal to 3 mm.

2. The method according to claim 1, wherein in step (a), the starting product is pulverulent and has a dry matter content of from 70 to 98% by weight and wherein step (a) includes one or more of:
  mixing said pulverulent starting product with at least one ingredient in the thermomechanical treatment machine, and
  shearing said pulverulent starting product in the thermomechanical treatment machine, and
  thermos-treating the said pulverulent starting product in the thermomechanical treatment machine.

3. The method according to claim 1, in step (a), the starting product is pulverulent and has a dry matter content of from 70 to 98% by weight and wherein step (a) includes mixing said pulverulent starting product with viscous added product in the thermomechanical treatment machine.

4. The method according to claim 3 wherein said viscous added product has a viscosity greater than 100 mPa·s and a dry matter content of from 50 to 90% by weight.

5. The method according to claim 3, wherein step (a) further includes one or more of:
  before mixing said pulverulent starting product with said viscous added product, mixing said pulverulent starting product with at least one ingredient in the thermomechanical treatment machine,
  after mixing said pulverulent starting product with said viscous added product, shearing said pulverulent starting product mixed with said viscous added product in the thermomechanical treatment machine, and
  after mixing said pulverulent starting product with said viscous added product, thermo-treating said pulverulent starting product mixed with said viscous added product in the thermomechanical treatment machine.

6. The method according to claim 1, wherein in step (a) the starting product is viscous, and wherein step (a) includes one or more of:
  mixing said viscous stating product with at least one ingredient in the thermomechanical treatment machine,
  shearing said viscous starting product in the thermomechanical treatment machine, and
  thermo-treating said viscous starting product in the thermomechanical treatment machine.

7. The method according to claim 6, wherein said viscous starting product has a viscosity greater than 100 mPa·s and a dry matter content of from 50 to 90% by weight.

8. The method according to claim 1, wherein the method further comprises a step (d) comprising further drying the porous powdered product.

9. The method according to claim 8 wherein at the end of step (d), the porous powdered product has a dry matter content of the order of 96% by weight.

10. The method according to claim 1 wherein the first gas is identical with the second gas.

11. The method according to claim 1, wherein the first gas is carbon dioxide, air, steam, nitrogen or a nitrogen oxide.

12. The method according to claim 1 wherein the first gas represents at least 10% of the combined amount of the first and second gas.

13. The method according to claim 1 wherein the prepared viscous product of step (a) is milk, thereby obtaining powdered milk as the porous powdered product.

14. The method according to claim 1 wherein the prepared viscous product of step (a) is a natural or modified starchy product based on cereal flours, potato flour, potato granules, potato flake, tapioca flour or a mixture thereof, the starting product being in the form of a mixture of the solution, suspension or emulsion type in an aqueous medium.

15. The method according to claim 14, wherein the cereal flour is wheat flour, oat flour, maize flour, barley flour or a mixture thereof.

16. The method according to claim 1 wherein the prepared viscous product of step (a) is a natural or modified protein product selected from milk casein, wheat gluten, maize zein, soybean proteins, legume proteins, proteins of oleaproteaginous crops or a mixture thereof, the starting product being in the form of a mixture of the solution, suspension or emulsion type in an aqueous medium.

17. The method according to claim 1 wherein the prepared viscous product of step (a) is a milk fractionation co-product obtained by fractionating milk by centrifugation, filtration, nanofiltration, ultrafiltration and/or reverse osmosis, a milk fractionation by-product obtained by fractionating milk by centrifugation, filtration, nanofiltration, ultrafiltration and/or reverse osmosis, a co-product obtained by coagulation of milk, or a mixture thereof.

18. The method according to claim 1, wherein the first gas is different from the second gas.

19. The method according to claim 1, wherein the second gas is carbon dioxide, air, steam, nitrogen or a nitrogen oxide.

20. The method according to claim 1, wherein the prepared viscous product of step (a) has a viscosity greater than 200 mPa·s.

21. The method according to claim 1, wherein the thermo-mechanical treatment machine is an extrusion machine having two co-rotating and co-penetrating screws which are driven in rotation at a speed of from 50 to 1200 rpm, and wherein each screw has a part in which sub-step (b1) is performed and which has a length representing between 3 and 12 times of a diameter of the screw.

22. The method according to claim 1, wherein the prepared viscous product of step (a) has a dry matter content of from 10 to 90% by weight.

* * * * *